United States Patent
Bruck et al.

(10) Patent No.: US 11,344,975 B2
(45) Date of Patent: May 31, 2022

(54) OPTICALLY CONDUCTIVE FILLER FOR LASER PROCESSING

(71) Applicant: Siemens Energy, Inc., Orlando, FL (US)

(72) Inventors: Gerald J. Bruck, Oviedo, FL (US); Ahmed Kamel, Orlando, FL (US)

(73) Assignee: SIEMENS ENERGY, INC., Orlando, FL (US)

(*) Notice: Subject to any disclaimer, the term of this patent is extended or adjusted under 35 U.S.C. 154(b) by 628 days.

(21) Appl. No.: 14/682,315

(22) Filed: Apr. 9, 2015

(65) Prior Publication Data

US 2016/0297034 A1 Oct. 13, 2016

(51) Int. Cl.
*B23K 35/02* (2006.01)
*B23K 26/70* (2014.01)
(Continued)

(52) U.S. Cl.
CPC .......... *B23K 35/0261* (2013.01); *B22F 12/00* (2021.01); *B23K 26/0648* (2013.01); *B23K 26/0652* (2013.01); *B23K 26/0734* (2013.01); *B23K 26/34* (2013.01); *B23K 26/354* (2015.10); *B23K 26/702* (2015.10); *B23K 35/0272* (2013.01); *B23K 35/0277* (2013.01); *B23K 35/3033* (2013.01); *B23K 35/365* (2013.01); *B23K 35/368* (2013.01); *B22F 10/10* (2021.01);
(Continued)

(58) Field of Classification Search
CPC ............ B23K 26/0648; B23K 26/0652; B23K 26/0734; B23K 26/064; B23K 26/34; B23K 26/342; B23K 26/354; B23K 26/702; B23K 35/0261; B23K 35/0272; B23K 35/0277; B23K 35/3033; B23K 35/365; B23K 35/368; B23P 6/00; B33Y 10/00; B33Y 30/00; B33Y 70/00
USPC .... 219/121.64, 84, 76.12, 73.21, 73.2, 73.1, 219/73.11, 76.1–77
See application file for complete search history.

(56) References Cited

U.S. PATENT DOCUMENTS 2,121,770 A * 6/1938 Chadwick .......... B23K 35/0272
148/24
4,658,109 A 4/1987 Honeycutt et al.
(Continued)

FOREIGN PATENT DOCUMENTS

JP 07251293 A 3/1995
JP H0910977 A * 1/1997 ............ B23K 26/00
(Continued)

OTHER PUBLICATIONS

English translation of JPH0910977A.*
(Continued)

*Primary Examiner* — Ibrahime A Abraham
*Assistant Examiner* — Chris Q Liu

(57) ABSTRACT

A filler feed wire (20) including both a laser conductive element (26) and a filler material (22) extending along a length of the wire. Laser energy (30) can be directed into a proximal end (32) of the laser conductive element for melting a distal end (34) of the feed wire to form a melt pool (24) for additive fabrication or repair. The laser conductive element may serve as a flux material. In this manner, laser energy is delivered precisely to the distal end of the feed wire, eliminating the need to separately coordinate laser beam motion with feed wire motion.

5 Claims, 3 Drawing Sheets

(51) Int. Cl.
*B23K 35/30* (2006.01)
*B23K 35/365* (2006.01)
*B23K 35/368* (2006.01)
*B23K 26/06* (2014.01)
*B23K 26/34* (2014.01)
*B23K 26/354* (2014.01)
*B23K 26/073* (2006.01)
*B22F 12/00* (2021.01)
*B33Y 10/00* (2015.01)
*B33Y 30/00* (2015.01)
*B33Y 70/00* (2020.01)
*B22F 10/10* (2021.01)

(52) U.S. Cl.
CPC ............... *B33Y 10/00* (2014.12); *B33Y 30/00* (2014.12); *B33Y 70/00* (2014.12)

(56) References Cited

U.S. PATENT DOCUMENTS

| | | | | |
|---|---|---|---|---|
| 5,430,816 A * | 7/1995 | Furuya | ................. | B23K 26/067 219/121.6 |
| 5,574,817 A * | 11/1996 | Henson | ................. | G02B 6/3839 156/166 |
| 5,838,860 A * | 11/1998 | Kingstone | ................. | F21V 29/74 385/100 |
| 6,404,961 B1 * | 6/2002 | Bonja | ................. | E21B 17/00 385/109 |
| 7,759,601 B2 | 7/2010 | Tamura et al. | | |
| 2002/0186938 A1 * | 12/2002 | Stottlemyer | ......... | G02B 6/4432 385/103 |
| 2005/0169588 A1 * | 8/2005 | Sutehall | ............... | G02B 6/4438 385/109 |
| 2006/0098694 A1 * | 5/2006 | Hongo | ............... | G02B 6/02328 372/6 |
| 2009/0182313 A1 * | 7/2009 | Auld | ................. | A61B 17/28 606/15 |
| 2010/0135820 A1 * | 6/2010 | Olson | ................. | B29C 73/10 416/241 R |
| 2010/0158661 A1 * | 6/2010 | Dawson | ................. | B23P 6/00 415/4.3 |
| 2013/0136868 A1 | 5/2013 | Bruck et al. | | |
| 2013/0140278 A1 | 6/2013 | Bruck et al. | | |
| 2014/0021188 A1 * | 1/2014 | Denney | ............... | B23K 35/0261 219/146.31 |
| 2014/0088575 A1 * | 3/2014 | Loeb | ................. | A61B 18/24 606/7 |
| 2014/0209571 A1 | 7/2014 | Bruck et al. | | |
| 2014/0263193 A1 | 9/2014 | Denney et al. | | |
| 2014/0291315 A1 * | 10/2014 | Mase | ................. | F01N 3/2828 219/553 |

FOREIGN PATENT DOCUMENTS

| | | |
|---|---|---|
| JP | 09182983 A | 7/1997 |
| JP | 2003048087 A | 2/2003 |
| RU | 2139159 C1 | 10/1999 |
| RU | 2181497 C2 | 4/2002 |
| RU | 2478029 C2 | 3/2013 |
| RU | 151262 U1 | 3/2015 |
| WO | 2009039753 A1 | 4/2009 |

OTHER PUBLICATIONS www.merriam-webster.com/helix, def. 1.b. Last accessed Aug. 26, 2021.*

PCT International Search Report and Written Opinion dated May 30, 2016 corresponding to PCT Application No. PCT/US2016/021433 filed Mar. 9, 2016 (14 pages).

* cited by examiner

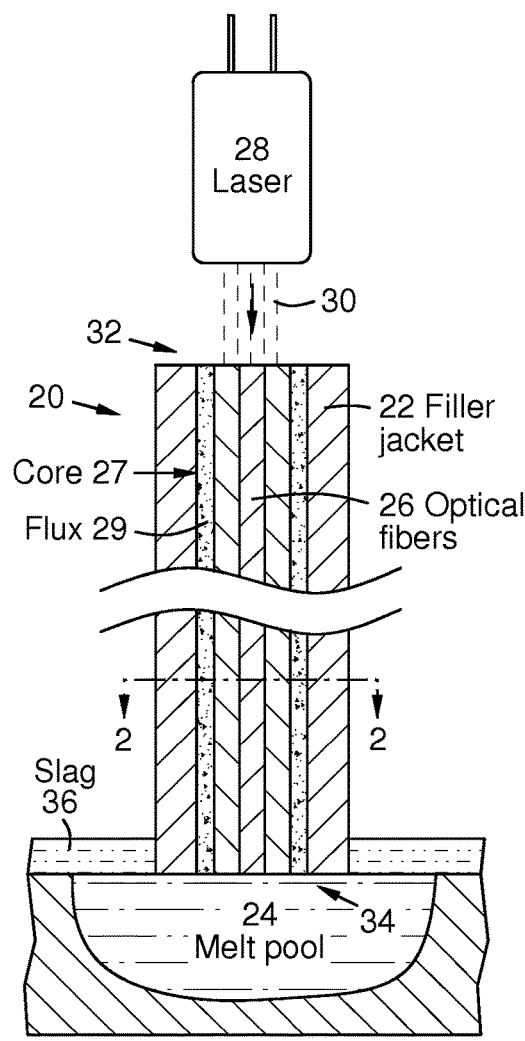
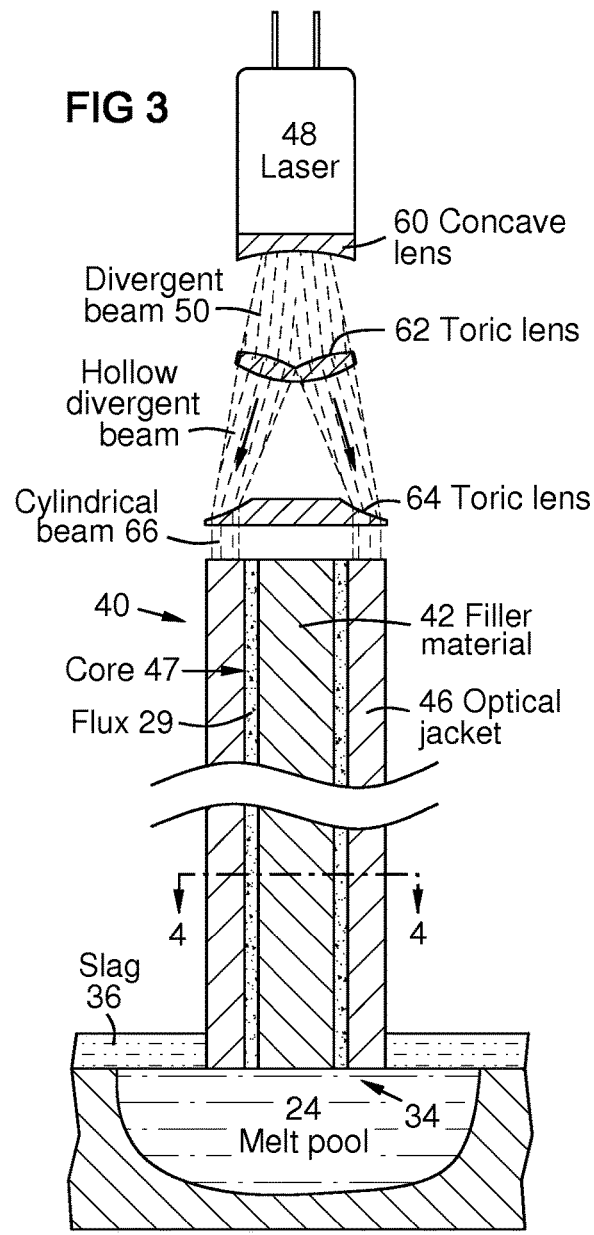
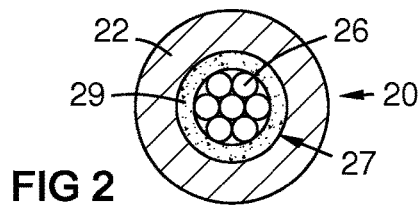
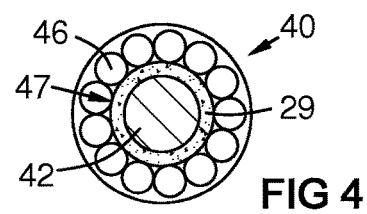

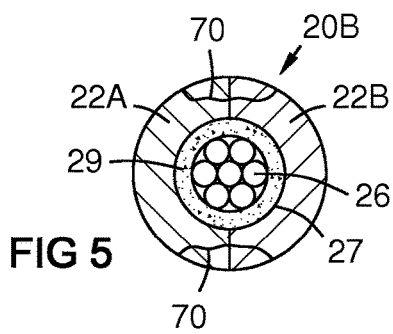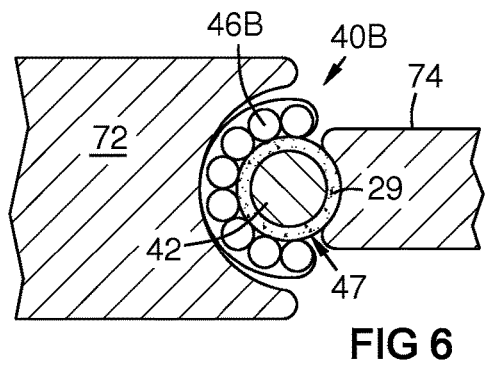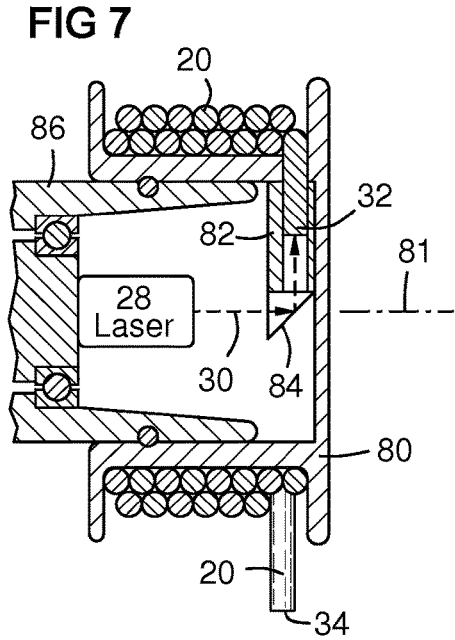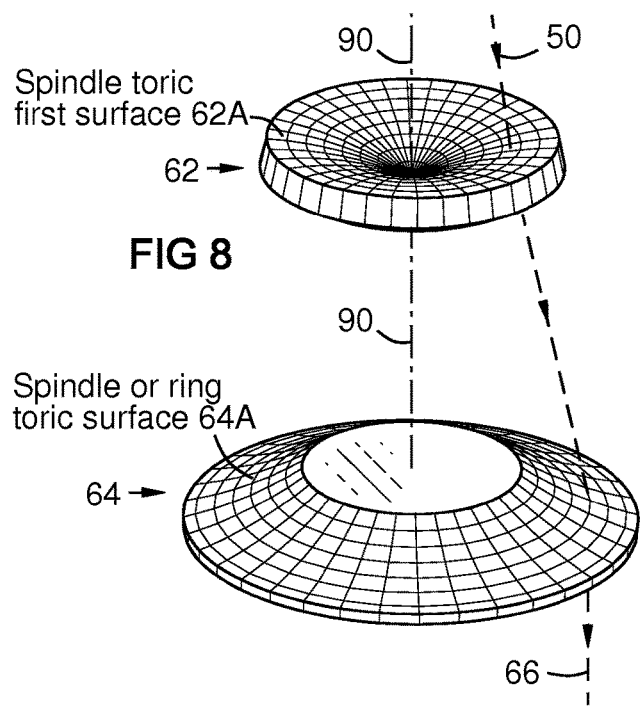

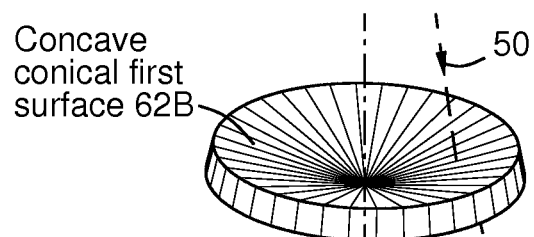
FIG 9
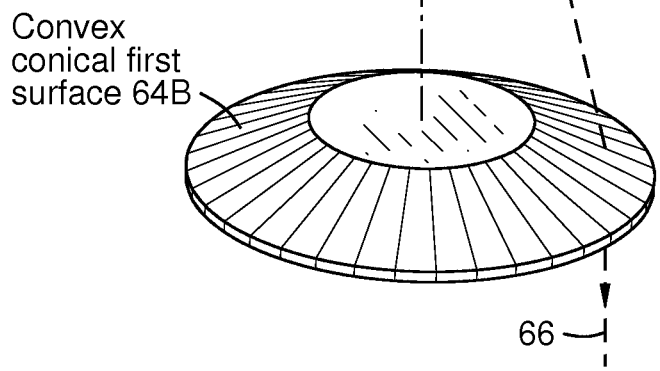
FIG 10
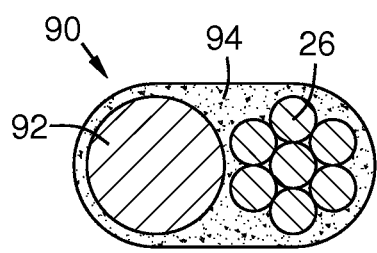
FIG 11
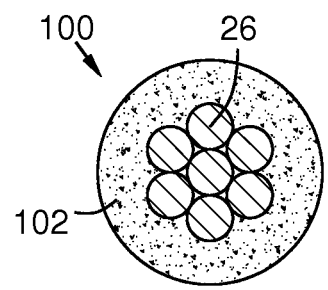

OPTICALLY CONDUCTIVE FILLER FOR LASER PROCESSING

FIELD OF THE INVENTION

This invention relates to apparatus and methods for additive fabrication and repair, and particularly relates to delivery of laser energy for melting a filler feed wire in such methods.

BACKGROUND OF THE INVENTION

Coordinating the delivery of laser energy with feeding of filler material during laser welding and cladding is challenging. Powdered filler may be preplaced, but this is labor intensive, is limited to positioning that can be retained by gravity, and is prone to scattering during processing. A filler feed wire may be fed to any position, but its movement must be coordinated with movement of the laser beam.

BRIEF DESCRIPTION OF THE DRAWINGS

The invention is explained in the following description in view of the drawings that show:

FIG. 1 is a side sectional view of a filler feed wire with central laser optical fibers.

FIG. 2 is a transverse sectional view of the filler feed wire of FIG. 1 taken along line 2-2.

FIG. 3 is a side sectional view of a filler feed wire with outer laser optical fibers.

FIG. 4 is a transverse sectional view of the filler feed wire of FIG. 1 taken along line 4-4.

FIG. 5 is a transverse sectional view of a filler feed wire embodiment as in FIG. 1 showing fabrication.

FIG. 6 is a transverse sectional view of another filler feed wire embodiment showing fabrication.

FIG. 7 is a side sectional view of a filler feed wire spool with laser injection.

FIG. 8 shows conceptual surface geometry of refractive lenses that shape a laser beam into a tubular cylindrical beam.

FIG. 9 shows alternate surface geometry of refractive lenses that shape a laser beam into a tubular cylindrical beam.

FIG. 10 is a transverse sectional view of a side-by-side embodiment.

FIG. 11 is a sectional view of an optical conductor jacketed by a binder containing a concentrated powder of filler and flux constituents.

DETAILED DESCRIPTION OF THE INVENTION

The present inventors have recognized that in submerged arc welding (SAW), gas metal arc welding (GMAW), and flux cored arc welding (FCAW), the filler wire serves dual functions of providing the filler metal and of conducting the electrical energy to effect the arc welding process, and thus that the energy is always delivered precisely to the end of the filler wire. The present inventors herein describe a filler feed wire for use with laser processing which provides that same advantage.

FIG. 1 is a side sectional view of a filler feed wire 20 with a jacket 22 of filler material such as metal to be added to a melt pool 24 for welding, cladding, or additive fabrication. The feed wire has a laser conductive element such as optical fibers 26 in a core 27 of the wire. A laser emitter 28 injects a laser beam 30 into the laser conductive element at a proximal end 32 of the feed wire. Flux 29 and/or filler constituent additions may be disposed in the core, such as in powder form.

For example, the filler jacket 22 may be fabricated from an extrudable subset of a desired superalloy such as NiCoCrAlY, which may be difficult to draw or extrude into a wire. However, a nickel wire can be made with the hollow core 27 containing powders of Co, Cr, Al, and Y, which combine with the nickel in the melt pool 24. These powders may be formed of particles in alloy form and/or as elemental or compound forms.

The laser conductive element 26 itself may serve as flux. For example silica ($SiO_2$) forms optical fibers that are highly transmissive of 1.06 micron laser light, and also functions as flux for laser processing of superalloy materials. The flux forms a protective layer of slag 36 over the melt pool 24. A benefit of this system is that laser energy is delivered precisely to the distal end 34 of the feed wire 20 eliminating the need to separately coordinate the laser beam motion with the feed wire motion. The laser power may be controlled proportional to the feed wire speed.

FIG. 2 is a transverse sectional view of the filler feed wire of FIG. 1 taken along line 2-2. The proportions may be adjusted, for example to enlarge the core 27 and/or the optical fibers 26 therein relative to the filler jacket 22. The filler jacket 22 may be extruded around the core 27 with rapid cooling to avoid overheating the optical fibers.

FIG. 3 is a side sectional view of a filler feed wire embodiment 40 with a core 47 containing filler material 42 and optionally further containing flux 29 and/or additional filler constituents. A laser conductive element, such as optical fibers 46, surrounds the core. A laser emitter 48 injects a laser beam 50 into the laser conductive element at a proximal end of the feed wire via lenses 60, 62, and 64 that shape the beam 50 into a tubular cylindrical beam 66 for injection into the laser conductive element 46. Flux 29 and elemental additions to the filler material may be disposed in the core.

A benefit of this embodiment is that it can be easily manufactured by coating a filler material wire 42 with flux 29 in a binder such as a polymer, then applying a circular array of optical fibers 46 in a matrix as a jacket on the core 47. The optical fibers 46 may be parallel. Alternately they may be hollow-braided around the core 47 with a braiding machine, then impregnated with a matrix material such as polymer. The heat of extruding or drawing a filler material such as nickel to form the filler material wire 42 does not damage the later-added optical fibers. Still alternately, the filler metal may be a cored wire having flux and/or metal powder within its core.

FIG. 4 is a transverse sectional view of the filler feed wire of FIG. 4 taken along line 4-4. The proportions may be adjusted. A further benefit of this embodiment is the large laser conductive cross section, which provides high energy transmission capacity, and which may completely surround the filler material 42 for uniform heating of the melt pool. However, complete surrounding as shown is not a requirement of the invention.

FIG. 5 is a transverse sectional view of a filler feed wire embodiment 20B formed with a filler jacket in two halves 22A, 22B joined by shallow welds 70 or other bonding means such as transient liquid phase bonding that protects the optical fibers from excess heat.

FIG. 6 is a transverse sectional view of a filler feed wire embodiment 40B showing fabrication by forming an optical jacket 46B with a semi-circular or C-shaped cross section, and inserting a core 47 of filler material 42 and flux 29. The core may be inserted with an interference fit and/or with bonding for example with a polymer. A pair of opposed sheaves 72, 74 can push the finished core 47 into the C-shaped optical jacket 46B. Other embodiments may have a semi-circular of C-shaped jacket of filler material around a core of laser transmissive material.

FIG. 7 shows a filler feed wire on a spool 80 with an axis 81. A proximal end 32 of the filler feed wire is inserted inwardly into a coupler 82 with a reflector 84 that receives a laser beam 30 along the axis 81 of the spool and reflects the beam into the proximal end of the filler feed wire. This allows the laser emitter 28 to remain stationary while the spool rotates on a hub to feed the wire 20 during additive fabrication or repair; either by freewheeling or by motor-controlled unwinding of the filler feed wire.

FIG. 8 shows conceptual surface geometry 62A, 64A of a pair of refractive lenses 62 and 64 as shown in FIG. 3 for shaping a laser beam 50 into a tubular beam 66. Surface 62A may be spindle toric, including a first concave aspect about the major axis 90 that produces a divergent beam with a hollow center. It may also have a second convex aspect that thins the beam walls with distance as shown in FIG. 3. The second surface of lens 62 may be conic, spherical, or toric, depending on the amount of beam wall thinning needed. Surface 64A may be spindle or ring toric including a first convex aspect about the major axis 90, and a second concave aspect, which together collimate the divergent hollow beam, forming a cylindrical tube that couples with the optical jacket (FIG. 3). Other lens shapes may be used depending on the emitter beam width relative to the final tubular beam width. For example, as shown in FIG. 9, surface 62B may be concave conical, and surface 64B may be convex conical if no beam wall thinning is needed. Equivalent Fresnel lenses may be used. Alternately, reflective lenses may be used. Alternately, the laser emitter 28 may produce a tubular beam via a laser cavity with a feedback reflector having a fully reflective central portion surrounded by an annular partially reflecting portion.

Other geometries of co-extending laser conductive material and filler material may be envisioned, such as both materials extending along a length of the filler wire side-by-side and held together by a binding material which connects or surrounds the side-by-side constituents. The binding material may include a powder of other constituent materials, such as fluxing or alloying materials. Exemplary binding materials include cellulose, ceramic (e.g. silica, alumina, Nextel, etc.) fiber, and ceramic fabric.

FIG. 10 is a sectional view of an embodiment 90 having a filler material 92 and an optical conductor 26, bound side-by-side by a binder 94 such as a polymer.

FIG. 11 is a sectional view of an embodiment 100 having an optical conductor 26 jacketed by a powdered filler material in a binder 102 such as a polymer containing a concentrated powder of filler and flux constituents.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A filler feed wire for additive fabrication comprising:
a laser conductive element extending along and defining a length of the filler feed wire, the laser conductive element having a first end and a second end arranged to conduct a laser energy from the first end to the second end of the laser conductive element;
a metal filler material that extends along the length of the filler feed wire, the filler material having an end that is added to a melt pool for additive fabrication, welding or cladding; and
wherein the laser conductive element comprises at least one optical fiber arranged such that a portion of the laser conductive element and the filler material are added to the melt pool,
wherein the laser conductive element comprises a circular array of optical fibers that surrounds a core comprising the filler material.

2. A filler feed wire for additive fabrication comprising:
a laser conductive element extending along and defining a length of the filler feed wire, the laser conductive element having a first end and a second end arranged to conduct a laser energy from the first end to the second end of the laser conductive element;
a metal filler material that extends along the length of the filler feed wire, the filler material having an end that is added to a melt pool for additive fabrication, welding or cladding; and
wherein the laser conductive element comprises at least one optical fiber arranged such that a portion of the laser conductive element and the filler material are added to the melt pool,
wherein the laser conductive element and filler material comprises a semi-circular or C-shape in transverse section with a core disposed within the semi-circular or C-shape.

3. A filler feed wire for additive fabrication comprising:
a laser conductive element extending along and defining a length of the filler feed wire, the laser conductive element having a first end and a second end arranged to conduct a laser energy from the first end to the second end of the laser conductive element;
a metal filler material that extends along the length of the filler feed wire, the filler material having an end that is added to a melt pool for additive fabrication, welding or cladding; and
wherein the laser conductive element comprises at least one optical fiber arranged such that a portion of the laser conductive element and the filler material are added to the melt pool,
wherein the laser conductive element comprises optical fibers braided around a core comprising the filler material.

4. A filler feed wire for additive fabrication comprising:
a laser conductive element extending along and defining a length of the filler feed wire, the laser conductive element having a first end and a second end arranged to conduct a laser energy from the first end to the second end of the laser conductive element;
a metal filler material that extends along the length of the filler feed wire, the filler material having an end that is added to a melt pool for additive fabrication, welding or cladding; and
wherein the laser conductive element comprises at least one optical fiber arranged such that a portion of the laser conductive element and the filler material are added to the melt pool,
wherein the filler material and the laser conductive element extend side-by-side along the length of the filler feed wire and are joined by a binding material.

5. The filler feed wire of claim 4, wherein the binding material comprises a powdered or fibrous material.

\* \* \* \* \*